(12) United States Patent
Thaveeprungsriporn et al.

(10) Patent No.: US 8,223,460 B2
(45) Date of Patent: *Jul. 17, 2012

(54) ASYMMETRIC LOAD BEAM FOR IMPROVING RESONANCE PERFORMANCE OF HARD DISK DRIVE SUSPENSION

(75) Inventors: Visit Thaveeprungsriporn, Bangkok (TH); Khampon Sittipongpanich, Bangkok (TH); Christopher Schreiber, Lake Elsinore, CA (US)

(73) Assignee: Magnecomp Corporation, Murrieta, CA (US)

( * ) Notice: Subject to any disclaimer, the term of this patent is extended or adjusted under 35 U.S.C. 154(b) by 661 days.

This patent is subject to a terminal disclaimer.

(21) Appl. No.: 12/390,344

(22) Filed: Feb. 20, 2009

(65) Prior Publication Data

US 2009/0161259 A1    Jun. 25, 2009

Related U.S. Application Data

(63) Continuation-in-part of application No. 11/303,183, filed on Dec. 15, 2005, now Pat. No. 7,508,633.

(60) Provisional application No. 60/638,883, filed on Dec. 21, 2004.

(51) Int. Cl.
*G11B 5/48* (2006.01)
(52) U.S. Cl. .................................. 360/244.9
(58) Field of Classification Search .......... 360/244.5, 360/244.8, 244.9, 265.9
See application file for complete search history.

(56) References Cited

U.S. PATENT DOCUMENTS

| | | | |
|---|---|---|---|
| 5,936,803 A | 8/1999 | Berding | |
| 5,999,369 A * | 12/1999 | Shimizu et al. | 360/244.5 |
| 6,043,956 A | 3/2000 | Hanya et al. | |
| 6,088,192 A * | 7/2000 | Riener et al. | 360/266.1 |
| 6,397,699 B1 | 6/2002 | Ikemoto et al. | |
| 6,632,310 B2 | 10/2003 | Freeman et al. | |
| 6,920,018 B2 * | 7/2005 | Oh et al. | 360/244.8 |
| 6,958,879 B2 | 10/2005 | Oh et al. | |
| 7,023,665 B2 | 4/2006 | Riener | |
| 7,035,054 B2 * | 4/2006 | Honda et al. | 360/265.9 |
| 7,038,885 B2 * | 5/2006 | Erpelding | 360/244 |
| 7,054,109 B2 * | 5/2006 | Erpelding | 360/244.2 |
| 7,218,479 B2 * | 5/2007 | Kuwajima et al. | 360/244.5 |
| 7,280,316 B1 | 10/2007 | McCaslin et al. | |
| 7,408,743 B1 | 8/2008 | McCaslin et al. | |
| 7,508,633 B1 * | 3/2009 | Thaveeprungsriporn et al. | 360/244.9 |
| 7,606,000 B1 * | 10/2009 | Brandts et al. | 360/244.8 |
| 2004/0001287 A1 * | 1/2004 | Honda et al. | 360/244.2 |
| 2004/0090710 A1 * | 5/2004 | Honda et al. | 360/244.8 |
| 2004/0246624 A1 * | 12/2004 | Hashi et al. | 360/244.2 |
| 2005/0007702 A1 * | 1/2005 | Oh et al. | 360/245 |

FOREIGN PATENT DOCUMENTS

JP          09082052 A  *  3/1997

* cited by examiner

*Primary Examiner* — Will J Klimowicz
(74) *Attorney, Agent, or Firm* — Intellectual Property Law Offices of Joel Voelzke, APC

(57) ABSTRACT

A structure for a load beam used in hard disk drive devices includes an asymmetric structure. The load beam exhibits longitudinal asymmetry (i.e., is asymmetric along its long axis) in regard to the weight distribution, but has a center of mass that lies along its longitudinal axis due to the provisioning of counterbalancing features, such as the addition of material, the removal of material, or a combination of adding material and removing material, or the use of an asymmetrical damping layer.

20 Claims, 7 Drawing Sheets

◊ Partial etch

Partial etch

Partial etch

ASYMMETRIC LOAD BEAM FOR IMPROVING RESONANCE PERFORMANCE OF HARD DISK DRIVE SUSPENSION

CROSS-REFERENCE TO RELATED APPLICATION

This application is a continuation-in-part of U.S. application Ser. No. 11/303,183 filed Dec. 15, 2005, which claims priority from U.S. Provisional Application No. 60/638,883, filed Dec. 21, 2004, the disclosures of which are fully incorporated herein by reference for all purposes.

BACKGROUND OF THE INVENTION

The present invention generally relates to a disk drive apparatus. More particularly, the present invention provides a hard disk drive that compensates for flow induced vibrations, commonly called disk flutter.

A hard disc drive (HDD) unit generally uses a spinning storage medium (e.g., a disk or platter) to store data. A read-write head is positioned in close proximity to the spinning storage medium by an HSA (Head Stack Assembly). Mounted on the HSA, a suspension assembly commonly includes a base plate, a load beam, and a flexure trace gimbal to which a slider is mounted. The slider supports the read-write head element. The load beam is generally composed of an actuator mounting section, a spring region, and a rigid region. The spring region gives the suspension a spring force or preload counteracting the aerodynamic lift force created by the spinning medium during reading or writing. A gimbal is mounted at the distal end of the load beam and supports the slider allowing the head to have pitch and roll movement in order to follow the irregularities of the disk surface. In this way, the suspension assembly is arranged to read data from and write data to the storage medium.

Demand generally requires increased HDD storage capacity, which generally compels higher data track densities for the storage medium. Furthermore, the demand for faster rates of data seeking and accessing also leads to higher rotational speeds. A significant obstacle associated with increasing rotational speeds and storage capacity is often head positioning accuracy as the head flies above the spinning storage medium.

A significant obstacle to head positioning accuracy is disk flutter. Disk flutter is an aero-elastic instability induced by the coupling of the spinning storage medium and the air surrounding the media resulting in disk vibration modes. These flow induced vibrations can physically cause an off-track misalignment of the head to the desired track resulting in failure to access or write data on the right track. Problems associated with disk flutter become more intolerable with higher track densities and disk rotation speeds.

Accordingly, novel solutions for operating hard disk drives to substantially reduce off-track misalignment induce by disk flutter are needed.

BRIEF SUMMARY OF THE INVENTION

Techniques for a disk drive apparatus are provided. More particularly, the present invention provides a method and apparatus for reading and writing information onto a hard disk drive to further improve resonance and flow induced vibration performance. Merely by way of example, illustrative embodiments of the present invention disclose a method and apparatus for a load beam that has an unequal mass distribution, but is configured so that its center of mass lies along the longitudinal axis of the load beam.

Commonly owned U.S. Pat. Nos. 7,280,316 and 7,408,743 ("the McCaslin et al. patents"), both issued to McCaslin et al., and both of which are fully incorporated by reference herein, disclose techniques and structures to couple a load beam to its struts in order to compensate for flow induced vibrations. For example, in one embodiment, a method for operating a disk drive apparatus includes following by a suspension assembly from a reference position to a second position a vertical movement of a rotating disk. The suspension assembly is predisposed to move from the reference position to the second position by a vertical offset between first and second struts of the suspension assembly, with the strut that is closest to the axis of rotation of the spinning disk being closer to the plane of the disk. That is, the inside strut is the lower strut. The struts are sometimes also referred to as springs, spring members, hinges, or hinge members. The result of the vertical offset in the struts is that a read/write head coupled to the suspension assembly with a vertical offset between the struts as taught by McCaslin et al. will remain in closer alignment to a selected track during the vertical movement into the second position than if the first and second struts were substantially co-planar (e.g., insignificant or no vertical offset).

There are various features that can provide a vertical offset between first and second struts of the suspension assembly. As discussed in greater detail in the McCaslin et al. patents, the vertical offset can be created by means including although not necessarily limited to: placing a shim underneath one or both ends of one of the struts to raise it up relative to the other strut; connecting one strut to the bottom of the load beam or the bottom of the base plate, and connecting the other strut to the top of the base plate or the top of the load beam; and partially etching the area on the load beam and/or the base plate or other actuator mounting structure onto which one of the struts will be welded, thereby defining a lowered, partial etch area to which the strut will be affixed such as by welding.

The features and structures that create the vertical offset may lead to asymmetry in the suspension assembly creating an imbalance in the center of mass along the central longitudinal axis of the load beam. Further improvements can be achieved by taking into account any mass imbalance resulting from implementations of the vertical offset. Thus, to further improve the benefits of the vertical offset feature on resonance and flow induced vibrations of suspension assembly, the load beam center of mass needs to be fine-tuned. For example, a longitudinal axis drawn down the center of the load beam demarcates a left side and a right side of the load beam. A center of mass is then calculated for each side of the load beam. The addition of stainless steel mass, an asymmetric vibration damping layer, or of other materials, or subtraction of material on either or both sides of the load beam, operates to bring the center of mass of both sides to coincide, so as to mass-balance the load beam about the central longitudinal axis of the load beam.

Various additional objects, features, and advantages of the present invention can be more fully appreciated with reference to the detailed description and accompanying drawings that follow.

DETAILED DESCRIPTION OF THE INVENTION

The diagrams shows herein are merely examples of various embodiments of the present invention, and therefore should not unduly limit the scope of the claims recited herein. One of ordinary skill in the art would recognize many variations, alternatives, and modifications.

Figure 1:
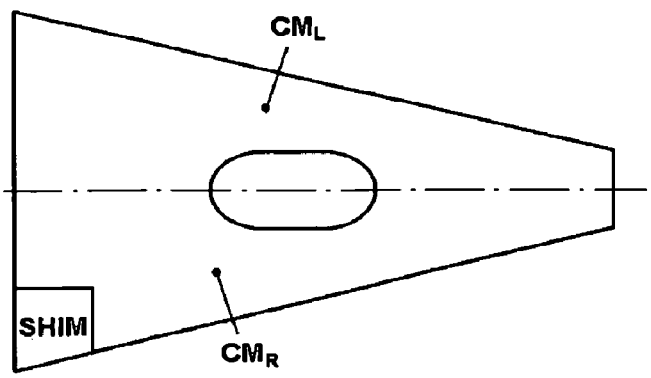
FIG. 1 is a simplified view of an asymmetric full thickness load beam of a suspension assembly according to an embodiment of the present invention.

FIG. 1 is a simplified view of a configuration of an asymmetric full thickness load beam of a suspension assembly. As discussed above in the McCaslin et al. patents, a load beam can be configured with an attachment (shim) to reduce flow-induced vibrations in the load beam, or other means to create a vertical offset between the struts.

As used herein, a "vertical offset" means that at least one part or end of one of the struts is at a different vertical level relative to the plane of the rotating hard disk, than is the corresponding part or end of the other strut. It is not strictly necessary that both ends of one of the struts be at a different vertical level than both corresponding ends of the other strut, or that all parts of one of the struts be at a different vertical level than all corresponding parts of the other strut. In the discussion that follows, for simplicity of discussion it will be assumed that that the vertical offset is created by a shim. It will be understood, however, that the vertical offset can be created by any of various means including, but not strictly limited to, the means discussed in the McCaslin et al. patents.

Figure 8:
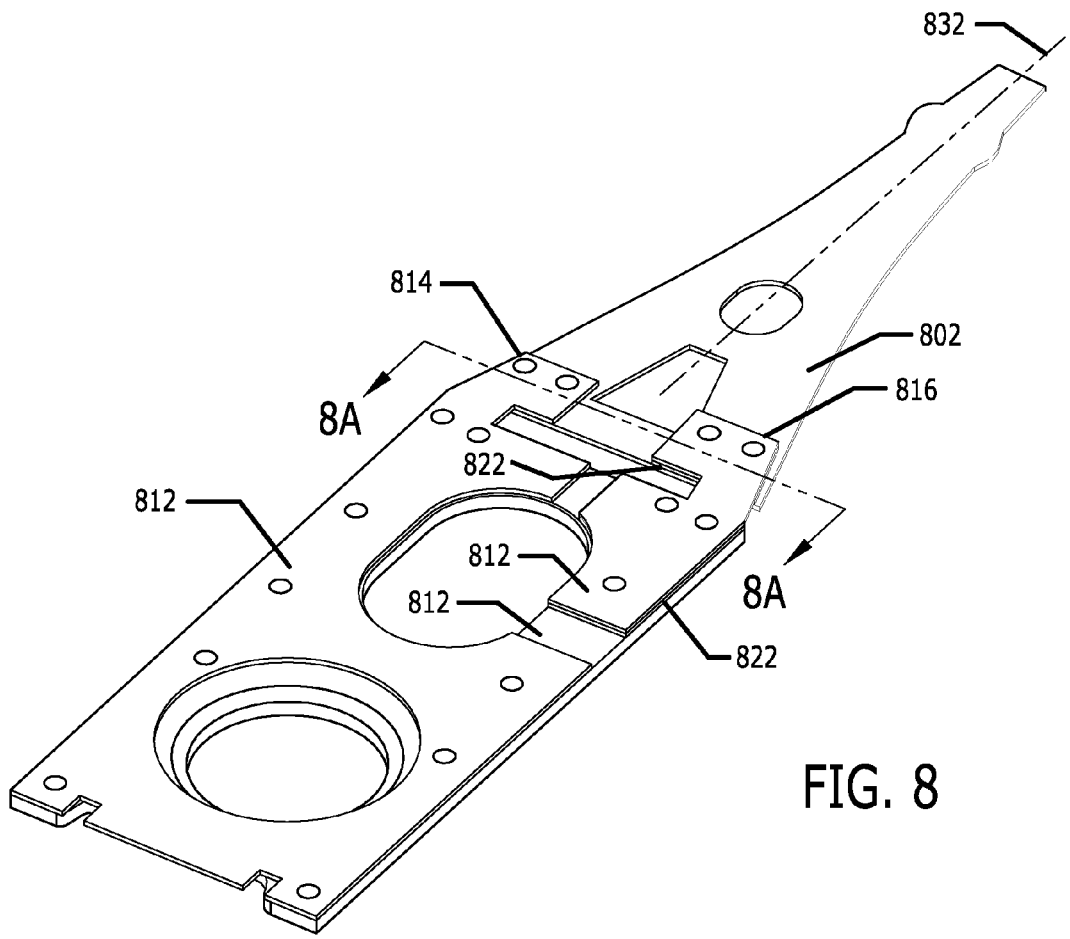
FIG. 8 shows an asymmetric load beam in a suspension assembly for a hard disk drive system.
Figure 8A:
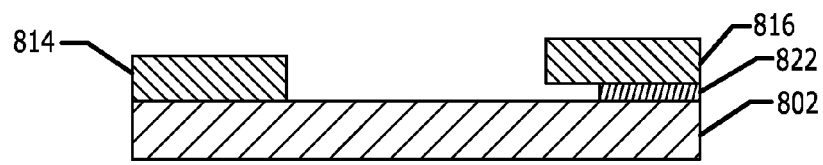
FIG. 8A is a cross-sectional view taken along the view line in FIG. 8.

Referring to FIG. 8 for a moment, a suspension 800 is shown comprising at least a hinged portion 812 coupled to an end of a load beam 802 by way of a hinge 814, 816. The hinge comprises first and second struts, 814, 816. The load beam is connected directly to one strut of the hinge 814. A shim 822 (which can also be referred to as a spacer, vertical offset element, etc.) is connected between another strut of the hinge 816 and the load beam 802. The shim 822 therefore creates a vertical offset hinge where one strut 816 is vertically offset relative to the other strut 814. This construction can be seen more clearly in the cross-sectional view of FIG. 8A taken along view line 8A-8A, and is discussed in more detail in the McCaslin et al. patents. The construction serves to reduce flow-induced vibrations in the load beam. Embodiments of additional vertical offset configurations and their effect are more thoroughly discussed in those patents.

The provisioning of the shim produces an asymmetric construction of the load beam which results in asymmetry between the right-side center of mass and the left-side center of mass of the load beam with respect to a longitudinal axis 832 down the length of the load beam. This creates an imbalance in the construction of the load beam resulting in the load beam having a center of mass that does not lie along its longitudinal axis.

FIG. 1 and subsequent figures show a generalized representation of the load beam 802 illustrated in FIG. 8. Although the load beam is generally a unitary structure, the longitudinal axis can be viewed as dividing the load beam into a right side and a left side. A right-side center of mass of the load beam, indicated by a dot and identified by the label $CM_R$, represents the center of mass of the right side of the load beam. Similarly, a left center of mass is indicated by a dot labeled as "$CM_L$". Thus, one can imagine that if the load beam is cut along the longitudinal axis into a ride-side piece and a left-side piece, then the right-side piece would have a center of mass, $CM_R$, and the left-side piece would have a center of mass, $CM_L$. If the $CM_R$ and the $CM_L$ are symmetric about the longitudinal axis, then the center of mass of the load beam component will lie along its longitudinal axis.

The presence of the shim creates a mass imbalance in the construction of the load beam, between the right side of the load beam and the left side of the load beam. This imbalance creates an asymmetric distribution of the center of mass of the right side of the load beam and the center of mass of the left side of the load beam about the longitudinal axis, resulting in a center of mass of the load beam that does not lie along the longitudinal axis. It can be appreciated that such an imbalance can be created in the load beam itself where there is an unequal distribution of mass in the structure of the load beam, in addition to any structure or structures attached to the load beam.

Figure 2:
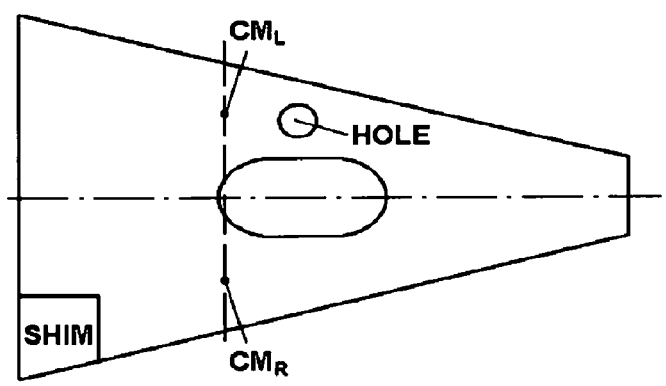
FIG. 2 is a simplified view of an asymmetric full thickness load beam of a suspension assembly with a lightening hole according to an embodiment of the present invention.

FIG. 2 is a simplified view of the asymmetric full thickness load beam of FIG. 1 configured in accordance with a feature of the present invention. A lightening hole can be formed in the material of the load beam. The lightening hole is a feature that reduces the mass of the load beam. FIG. 2 shows a lightening hole feature provided on the left side to change the mass distribution of the left side so as to change the location of the left-side center of mass. The lightening hole is sized and located on the left side of the load beam depending on the unequal mass distribution (whether as a result of attachment of a component to the load beam such as a shim, or whether the structure of the load beam itself has uneven mass distribution) the $CM_L$ is symmetric about the longitudinal axis with respect to the $CM_R$, thus positioning the center of mass of the load beam along its longitudinal axis. This "coincidence" or alignment of centers of gravity is illustrated in the figure by the line drawn through $CM_R$ and $CM_L$. More generally, one or more lightening holes can be formed in the load beam, with the lightening hole(s) defining an asymmetric hole pattern in the load beam about the longitudinal axis of the load beam.

Figure 3:
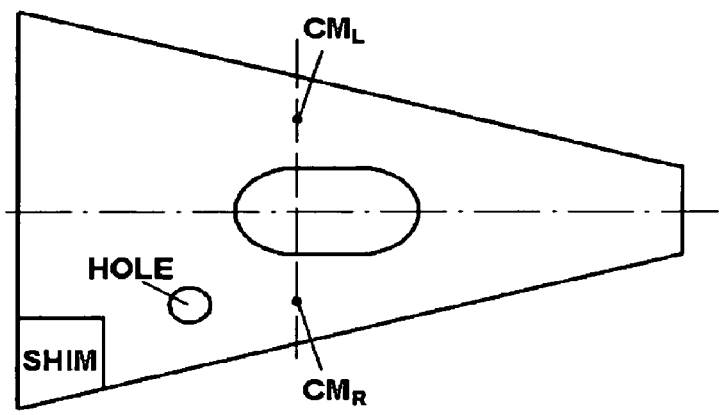
FIG. 3 is a simplified view of an asymmetric full thickness load beam of a suspension assembly with an alternative lightening hole according to an embodiment of the present invention.

FIG. 3 is a simplified view of an asymmetric full thickness load beam of a suspension assembly with an alternatively placed lightening hole to bring the center of mass of the right side of the load beam into coincidence with respect to the left-side center of mass about the longitudinal axis, thus positioning the center of mass of the load beam along its longitudinal axis.

FIGS. 2 and 3 illustrate that the center of mass of one side or the other can be repositioned using a lightening hole. FIG. 2 shows that the position of the center of mass of the left side of the load beam can be altered, while FIG. 3 shows that the position of the center of mass of the right side of the load beam can be altered. Although not shown, it can be appreciated of course that suitably-sized and suitable positioned lightening holes can be provided on both the left side and the right side of the load beam to adjust the locations of both centers of mass $CM_L$, $CM_R$ so that they are symmetric about the longitudinal axis.

Figure 4:
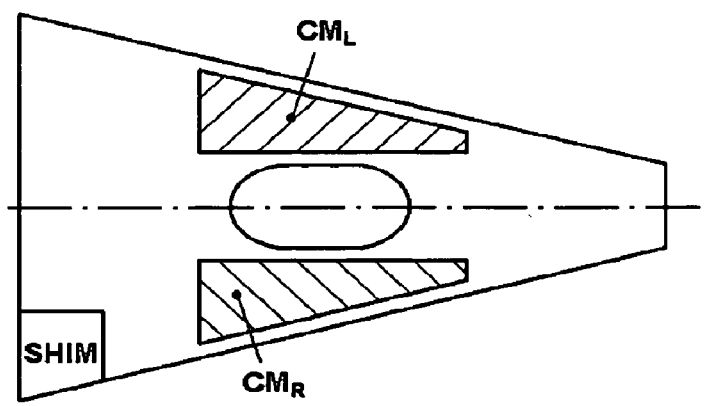
FIG. 4 is a simplified view of an asymmetric load beam according to an embodiment of the present invention with non-coincidence right center of mass ($CM_R$) and left center of mass ($CM_L$) about the longitudinal axis.

FIG. 4 is a simplified view of another asymmetric load beam configuration in which the $CM_R$ and $CM_L$ are not symmetric about the longitudinal axis due to uneven distribution of mass. The figure shows partially etched areas ("partial thickness areas" shown with shading) in each of the ride side and the left side of the load beam, thus creating portions of the load beam having different thicknesses.

Figure 5:
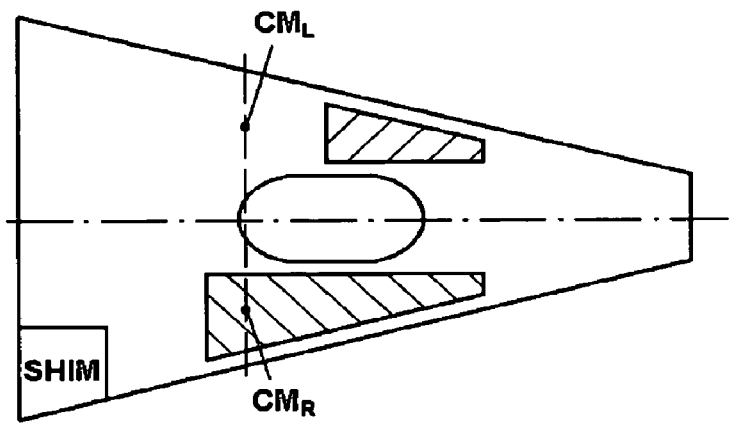
FIG. 5 is a simplified view of an asymmetric load beam according to an embodiment of the present invention with one or more asymmetric partial thickness areas.

FIG. 5 is a simplified view of an asymmetric load beam according to another embodiment of the present invention having one or more asymmetric partial thickness area features. Given that the shim results in an uneven distribution of mass in the load beam, the formation of properly sized and properly positioned partial thickness areas that are asymmetric about the longitudinal axis can reposition the $CM_R$ and $CM_L$ into coincidence about the longitudinal axis. This "coincidence" or alignment of centers of gravity is illustrated in the figure by the line drawn through $CM_R$ and $CM_L$. FIG. 5 shows the formation of a partial thickness area on the left side of the load beam to position the $CM_L$ so that is symmetric about the longitudinal axis with respect to the $CM_R$.

Figure 6:
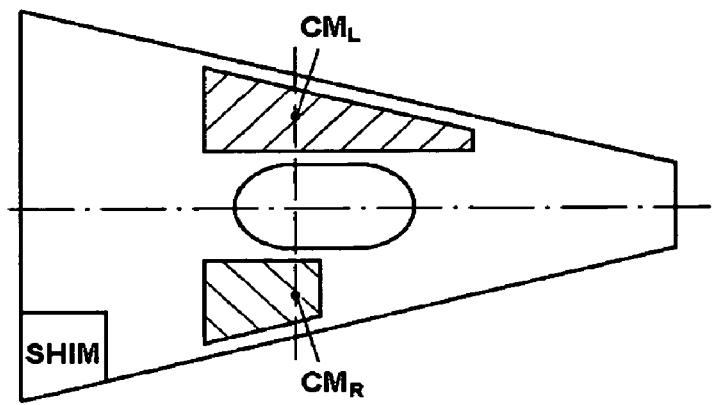
FIG. 6 is a simplified view of an asymmetric load beam with one or more partial thickness areas of a suspension assembly according to another embodiment of the present invention.

FIG. 6 is a simplified view of an asymmetric load beam with alternately configured partial thickness areas to position the $CM_R$ so that it is symmetric about the longitudinal axis with respect to the $CM_L$. This figure and FIG. 5 illustrate that the center of mass of one side of the load beam or the other can be re-positioned using partial thickness areas. Although not shown, it can be appreciated that suitably-sized and suitable positioned partial thickness areas can be provided to adjust the location of both centers of mass to achieve coincidence of the centers of mass about the longitudinal axis, instead of positioning just one of the centers of gravity.

Figure 7A:
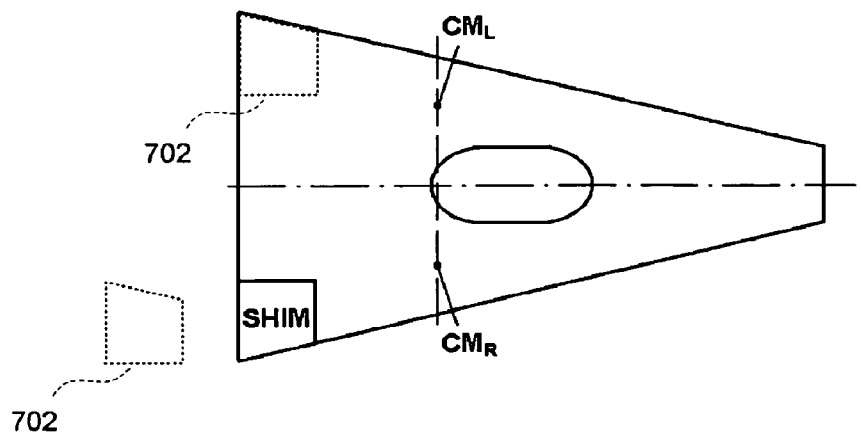
FIGS. 7A and 7B are simplified views of an asymmetric load beam with the addition of material to a suspension assembly according to alternate embodiments of the present invention.
Figure 7B:
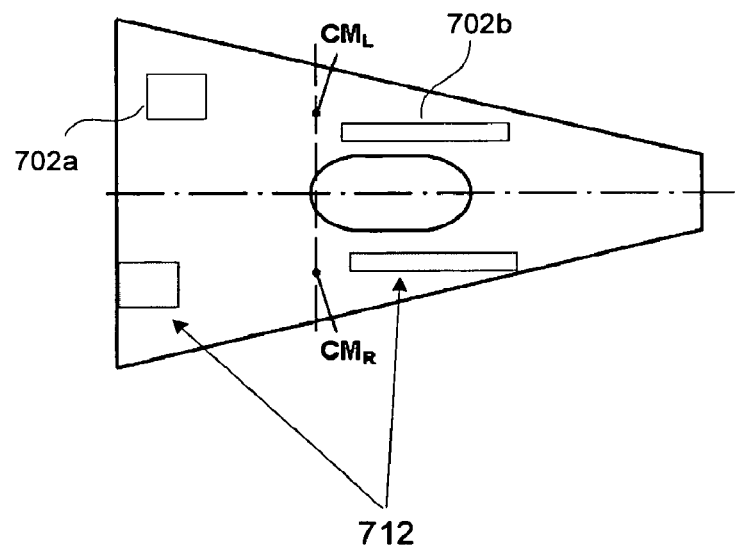

Refer now to FIGS. 7A and 7B for a discussion of yet another embodiment of the present invention. FIGS. 1 and 8 illustrate that the addition of a shim creates an asymmetric distribution of mass. The foregoing embodiments illustrate examples whereby the selective subtraction or removal of material from the load beam can be used to restore symmetry in terms of the center of mass of the load beam.

FIG. 7A shows an example whereby the selective addition of material to the load beam can produce the same result as selectively removing material. The figure shows the addition of a suitable counterweight 702 to the load beam to adjust the center of mass of the load beam according to the present invention. Counterweight 702 is affixed to the load beam, and thus counterbalances the mass asymmetry created by the structure employed to create the vertical offset between the struts. The mass of the counterweight 702 will depend on its location of attachment to the load beam. The material of the counterweight 702 can be the same as that of the object that created the mass imbalance; for example, the shim in FIG. 7A. The material of the counterweight 702 can be that of the load beam, or could be epoxy, or could be any material solder welded to the load beam, or in general can be any suitable material or composition of materials. The attachment of the counterweight 702 can be by any known suitable attachment method, for example, epoxy glue, welding, and so on. The shape of the counterweight 702 can match the shape of the object (e.g., shim), and in general can be any suitable shape.

In most cases, however, it may be desirable to match the shape of the counterweight 702 to the structure that created the mass imbalance in the first place. The counterweight 702 can be positioned so that the moments of inertia in the load beam component are symmetric, in addition to locating the center of mass of the load along a symmetric axis such as the longitudinal axis shown in the figures. The embodiment shown in FIG. 7A shows such an arrangement wherein the counterweight 702 is disposed on the surface of the load beam opposite the surface.

It can be appreciated of course that symmetry of the moments of inertia may not be necessary (or even desirable) in some special situations. The present invention therefore does not require the addition of material for the purpose of achieving symmetrical arrangement of moments of inertia.

FIG. 7B shows the use of two counterweights 702a, 702b and in general illustrates the fact that more than one counterweight can be used to offset one or more than one object 712 that create a mass imbalance. The counterweights can be shaped and/or distributed accordingly depending on their individual sizes and material composition. Though not shown, it can be readily appreciated that the subtraction of material and addition of material can be combined to adjust the center of mass in accordance with the present invention.

Figure 9:
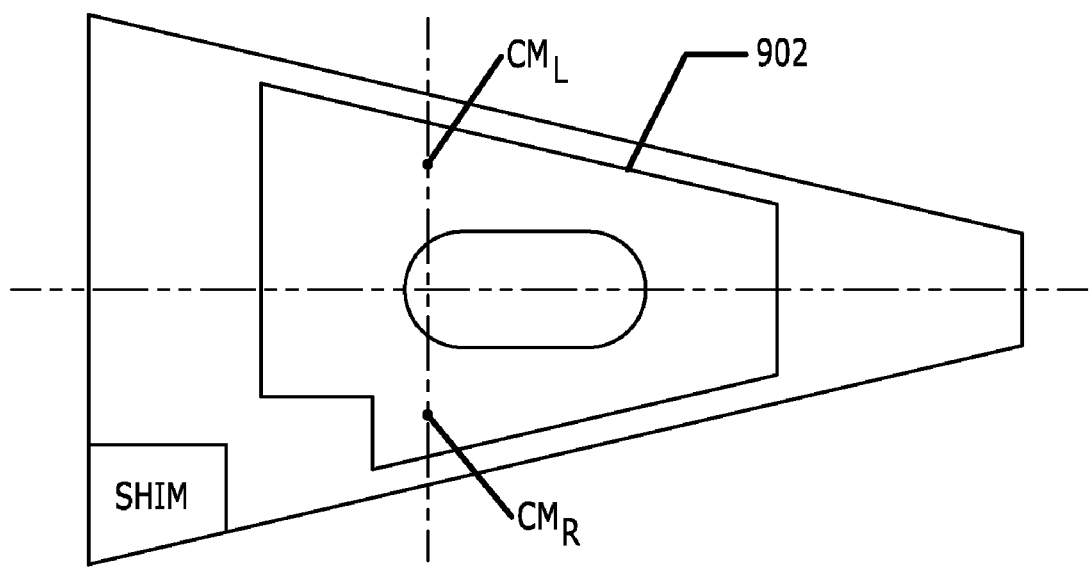
FIG. 9 is a simplified view of a load beam according to a further embodiment, in which an asymmetric damping layer acts as a counterweight to counteract the asymmetric mass of the shim that creates the vertical offset in the struts.

FIG. 9 shows an embodiment in which the counterweight is an asymmetrically shaped piece of vibration damping material 902. Whereas a vibration damping material designed to damp vibrations of the load beam in a hard disk drive suspension would normally be symmetric and would be symmetric about the longitudinal axis of the load beam, when used in conjunction with a load beam having an otherwise asymmetric distribution of mass about the longitudinal axis of the load beam, the damping material 902 would have an asymmetric shape and mass distribution such that the asymmetric mass distribution of the damping layer mass-balances the asymmetric mass distribution of the load beam due to the strut shim or other asymmetric features. The damping material thus fulfills the dual purposes of damping vibrations in the load beam, and balancing out the shim or other asymmetric feature(s) of the strut offset structure so that the center of mass of the load beam lies along the longitudinal axis. In the figure, the damping material 902 is not only asymmetric when considered by itself, but extends across the central longitudinal axis of the load beam and is asymmetric with respect to that longitudinal axis. The counterweight 902, considered together with either the offset structure itself or further considered with other parts of the suspension assembly, have a combined center of mass that lies along the longitudinal axis of the load beam.

The damping material 902 may be a damping laminate such as a sheet of stainless steel with a viscoelastic material such as viscoelastic adhesive applied thereto. The damping material may be a polymer such as melonix or other known viscoelastic polymer. Damping materials and laminates are well known, and are discussed in, e.g., U.S. Patent Publication No. 20030011936. Suitable organic polymers include polyester, polyethers, polyurethanes, polyethylenes, polypropylenes, polycarbonates, polyvinyl chlorides, polyvinylidene chloride, polyvinylidene fluoride, polytetrafluoroethylene, polyamide, polybutadiene, polybutadiene styrene, poly ABS, polystyrene, polybutylene, polyisoprene, and polyacrylates. Suitable inorganic polymers include polysulfides, polysiloxanes, and polyphosphates.

Figure 10:
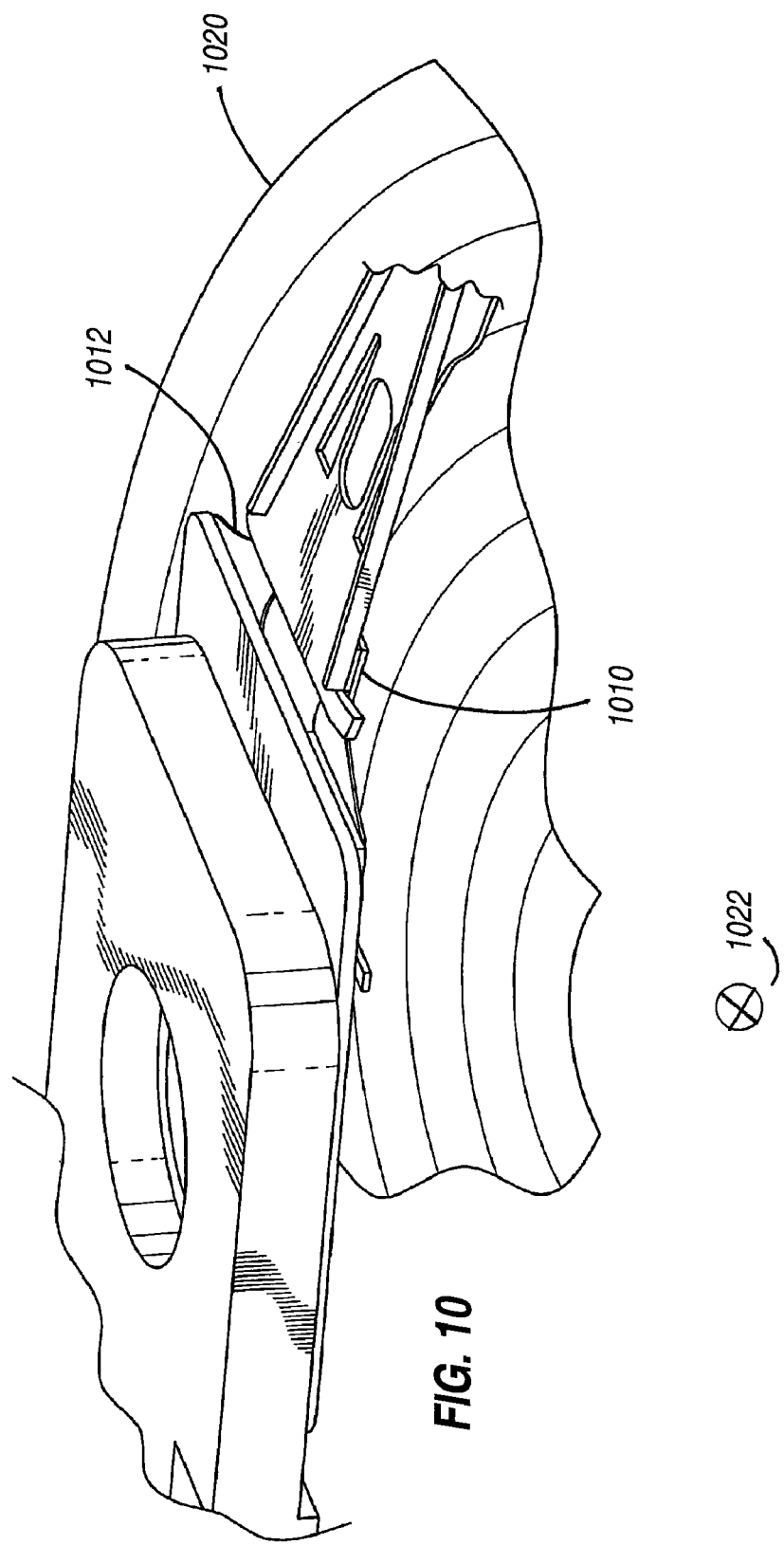
FIG. 10 is a perspective view showing an exemplary suspension of the invention mounted above a spinning disk platter within a disk drive.

In all of the embodiments, the suspension assembly is predisposed to move from the reference position to the second position by a vertical offset between first and second struts of the suspension assembly, with the strut that is closest to the axis of rotation of the spinning disk being closer to the plane of the disk. That is, the inside strut is the lower strut. The situation in shown in FIG. 10 which shows the inside strut 1010, i.e., the strut that is closest to the axis of rotation 1022 of spinning disk 1020, as closer to the surface of disk 1020 than outside strut 1012.

It is understood that the examples and embodiments described herein are for illustrative purposes only and that various modifications or changes in light thereof will be suggested to persons skilled in the art and are to be included within the spirit and purview of this application and scope of the appended claims.

We claim:

1. A suspension assembly for a hard disk drive, the suspension assembly comprising:
   a load beam having a first end and a second end, a length in the longitudinal direction being defined between the first end and the second end, a longitudinal axis of the load beam defining a first lateral side and a second lateral side of the load beam;
   a first strut and a second strut coupling the load beam to an actuator mounting section, the first and second struts coupling to the load beam on opposite sides of the longitudinal axis at about the second end of the load beam;
   means for creating a vertical offset between the first and second struts, said means also creating a mass imbalance in the suspension assembly about the longitudinal axis; and
   means for mass-balancing the load beam in order to counteract said mass imbalance, said mass-balancing means bringing a center of mass of the first lateral side into symmetry about the longitudinal axis with a center of mass of the second lateral side.

2. The suspension assembly of claim 1 wherein:
   said means for creating a vertical offset between the first and second struts comprises at least one shim underneath at least one end of the first strut on the first side of the load beam; and
   said means for mass-balancing comprises removing material from said load beam.

3. The suspension assembly of claim 2 wherein:
   said means for mass-balancing comprises a partial etch area on the first side of the longitudinal axis such that a center of mass of a first side of the longitudinal axis and a center of mass of a second side of the longitudinal axis opposite from the first side, are symmetric about the longitudinal axis.

4. The suspension assembly of claim 2 wherein:
   said means for mass-balancing comprises a first partial etch area on the first side of the longitudinal axis and a second partial etch area on the second side of the longitudinal axis, such that a center of mass of a first side of the longitudinal axis is symmetric about the longitudinal axis with respect to a center of mass of a second side of the longitudinal axis.

5. The suspension assembly of claim 1 wherein:
   said means for mass-balancing comprises a partial etch area such that a center of mass of a first side of the longitudinal axis is symmetric about the longitudinal axis with respect to a center of mass of a second side of the longitudinal axis.

6. The suspension assembly of claim 1 wherein:
   said means for creating a vertical offset between the first and second struts comprises at least one shim underneath at least one end of one of said struts; and
   said means for mass-balancing the load beam comprises a counterweight to counterbalance the means for creating a vertical offset between the first and second struts, the counterweight comprising an asymmetric arrangement of at least a first weight on the suspension assembly, the first weight being placed on the first lateral side, there being no counterpart to the first weight having substantially the same weight as the first weight on the second lateral side.

7. The suspension assembly of claim 1 wherein:
   said means for creating a vertical offset between the first and second struts comprises a first partial etch area underneath at least one end of one of said struts; and
   said means for mass-balancing the load beam comprises a second partial etch area, the second partial etch area being on the load beam to counterbalance the first partial etch area creating the vertical offset.

8. The suspension assembly of claim 1 wherein:
   said means for mass-balancing the load beam comprises a counterweight to counterbalance the means for creating a vertical offset between the first and second struts, such that a center of mass of the first side is brought into symmetry about the longitudinal axis with a center of mass of the second side.

9. The suspension assembly of claim 8 wherein:
   said counterweight comprises a damping material affixed to the load beam, the damping material having a mass and location such that said counterweight and said vertical offset means, taken together with other parts of the suspension assembly, bring the center of mass of the suspension assembly to lie along the longitudinal axis of the load beam.

10. The suspension assembly of claim 8 wherein:
    said counterweight comprises a damping material affixed to the load beam, the damping material having an asymmetric shape such that said counterweight and said damping material, taken together, have a combined center of mass that lies along the longitudinal axis of the load beam.

11. The suspension assembly of claim 9 wherein said damping material comprises a viscoelastic material.

12. The suspension assembly of claim 9 wherein said damping material comprises a polymer.

13. The suspension assembly of claim 9 wherein said damping material is selected from the group consisting of melonix, polyester, polyether, polyurethane, polyethylene, polypropylene, polycarbonate, polyvinyl chloride, polyvinylidene chloride, polyvinylidene fluoride, polytetrafluoroethylene, polyamide, polybutadiene, polybutadiene styrene, poly ABS, polystyrene, polybutylene, polyisoprene, polyacrylate, polysulfide, polysiloxane, and polyphosphate.

14. The hard disk drive comprising the suspension assembly of claim 1, and further comprising a storage medium, the suspension assembly being arranged to read data from and write data to the storage medium.

15. In a suspension assembly comprising a load beam and at least two struts coupling the load beam to an actuator mounting section, the suspension assembly further comprising:

an offset structure for raising one strut vertically relative to the other strut thereby defining a vertical offset between the struts, the offset structure having a mass associated therewith; and a counterbalance affixed to the load beam, the counterbalance having a mass that counteracts the mass of the offset structure such that the center of mass of the suspension assembly lies along a central longitudinal axis of the load beam, the counterbalance comprising an asymmetric arrangement of at least a first weight on the suspension, the first weight being placed on a first lateral side of the central longitudinal axis, the suspension assembly not having a second weight on a second lateral side opposite the first lateral side that is substantially symmetric in its mass and placement with the first weight.

16. The suspension assembly of claim 15 wherein said counterbalance comprises a damping layer for damping vibrations in the load beam.

17. The suspension assembly of claim 16 wherein said damping layer comprises a viscoelastic material.

18. In a suspension assembly for a disk drive comprising a load beam and first and second struts coupling the load beam to an actuator mounting section, the improvement comprising:

a coupling structure for coupling said struts to said load beam such that said first strut is disposed closer to an axis of rotation of a rotating data storage medium and is disposed closer to said rotating data storage medium than is said second strut; and an asymmetric counterbalancing feature on the load beam, the asymmetric counterbalancing feature defining counteracting mass to counteract a mass of said coupling structure that is asymmetric with respect to a central longitudinal axis of the load beam.

19. The suspension assembly of claim 18 wherein the asymmetric counterbalancing feature comprises a damping layer extending across the central longitudinal axis of the load beam and being asymmetrical with respect thereto.

20. The suspension assembly of claim 18 wherein said counterbalancing feature comprises a hole pattern in said load beam, the hole pattern being asymmetric with respect to the central longitudinal axis of the load beam.

* * * * *